United States Patent
Vranken et al.

(10) Patent No.: US 7,293,258 B1
(45) Date of Patent: *Nov. 6, 2007

(54) DATA PROCESSOR AND METHOD FOR USING A DATA PROCESSOR WITH DEBUG CIRCUIT

(75) Inventors: Hendrikus Petrus Elisabeth Vranken, Eindhoven (NL); Kornelis Antonius Vissers, Oakland, CA (US); Fransiscus Wilhelmus Sijstermans, Mountain View, CA (US)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/572,995

(22) Filed: May 17, 2000

(30) Foreign Application Priority Data

May 19, 1999 (EP) .................................. 99201568

(51) Int. Cl.
*G06F 9/44* (2006.01)
*G06F 15/00* (2006.01)

(52) U.S. Cl. .................... 717/129; 717/124; 712/4; 712/5; 712/7; 712/9

(58) Field of Classification Search ........ 717/124–131; 712/226–227, 2–9; 708/524–525; 711/125–126
See application file for complete search history.

(56) References Cited

U.S. PATENT DOCUMENTS

| | | | | |
|---|---|---|---|---|
| 5,255,385 A | * | 10/1993 | Kikuchi | 714/25 |
| 5,490,262 A | * | 2/1996 | Tahara | 711/123 |
| 5,517,436 A | * | 5/1996 | Andreas et al. | 708/524 |
| 5,560,009 A | * | 9/1996 | Lenkov et al. | 717/124 |
| 5,611,062 A | * | 3/1997 | Webb et al. | 712/200 |
| 5,623,650 A | * | 4/1997 | Beard et al. | 712/234 |
| 5,737,516 A | * | 4/1998 | Circello et al. | 714/38 |
| 5,790,854 A | * | 8/1998 | Spielman et al. | 717/150 |
| 5,870,582 A | * | 2/1999 | Cheong et al. | 712/218 |
| 6,035,422 A | * | 3/2000 | Hohl et al. | 714/35 |
| 6,175,913 B1 | * | 1/2001 | Chesters et al. | 712/227 |
| 6,426,746 B2 | * | 7/2002 | Hsieh et al. | 345/419 |
| 6,629,000 B1 | * | 9/2003 | Moon et al. | 700/94 |
| 6,681,315 B1 | * | 1/2004 | Hilts et al. | 712/4 |

* cited by examiner

*Primary Examiner*—Meng-Al T. An
*Assistant Examiner*—Insun Kang

(57) ABSTRACT

A data processor has a debug circuit arranged to monitor whether operand data used for execution of a program meets a debug exception condition. The debug exception condition tests a two or more of multi-bit subfields of a vector operand independently. Debug action is taken if one or more of the multi-bit subfields meet the corresponding conditions.

6 Claims, 1 Drawing Sheet

DATA PROCESSOR AND METHOD FOR USING A DATA PROCESSOR WITH DEBUG CIRCUIT

BACKGROUND OF THE INVENTION

The invention relates to a data processing circuit with a debug feature and a method of using such a circuit.

It is known to provide a data processor with a debug circuit that monitors data values that are output to memory. The debug circuit facilitates the analysis of the execution properties of programs at specific time points when specific conditions occur in the processor.

A known debug circuit causes an interruption of normal program execution when a data value equal to a specified value is output to memory. It is also known to specify a bit-mask in addition to the value, the interruption occurring when the data value is equal to the specified value at the bit positions that are enabled by the bit-mask.

It is also known to provide a data processor, such as a digital signal processor, with a vector processing capability. In this case, the data processor is able to process several arithmetic numbers in parallel in response to a vector instruction.

For example, a vector ADD instruction specifies two input operands. These operands are for example 64 bits long, the data processor handling these operands as containing four fields of 16 bit, each representing a 16 bit number. In response to the vector ADD instruction the data processor adds pairs of number from corresponding fields in the operands of the vector ADD instruction, without carry between different fields.

If applied to a vector processor the known debug circuit would make it possible to cause a debug interrupt when all fields of an operand have specified values, or when a mask-enabled field or combination of mask-enabled fields all have specified values.

SUMMARY OF THE INVENTION

Amongst others, it is an object of the invention to provide for a data processor with an improved capability of taking debug action. It is a further object of the invention to provide a data processor that has vector instructions with an improved capability of taking debug action.

The data processor according to the invention is set forth in Claim 1. In the data processor according to the invention, the debug circuit can be programmed to monitor data values in a more refined way than with a mask plus value. It is possible to take debug action whether one or more but less than all of a number of conditions is true. For example, one might program to take debug action as soon any one of a number of fields of a vector is zero, or if any one of the fields is bigger than a predetermined value or if one and no more than one of the number of fields meets such a condition etc.

BRIEF DESCRIPTION OF THE DRAWINGS

These and other advantageous aspects of the data processor and method according to the invention will be described in more detail using the following figures.

DETAILED DESCRIPTION OF THE INVENTION

Figure 1:
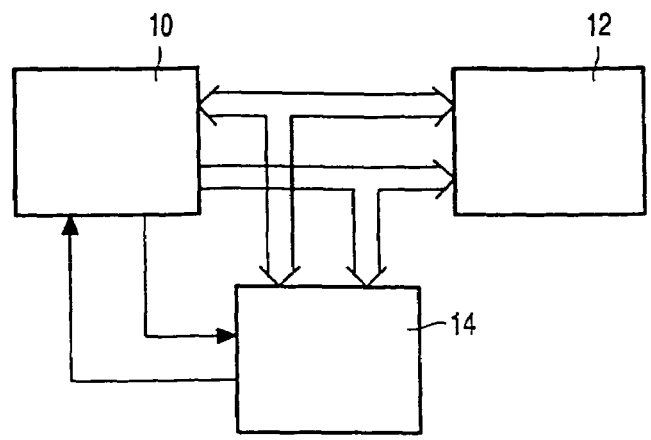
FIG. 1 shows a data processor

FIG. 1 shows a data processor. The data processor contains an instruction processing circuit 10, a memory 12 and a debug circuit 14. The instruction processing circuit 10 has an address and control output and a data input/output coupled to the memory 12. The debug circuit 14 is coupled to the data input/output and the address and control output. The debug circuit 14 has an output coupled to an interrupt input of the instruction processing circuit 10 and a programming input coupled to the instruction processing circuit 10.

In operation, the instruction processing circuit 10 processes a series of instructions from a program. These instructions may involve reading data from memory 12 and writing back data to memory 12. The debug circuit 14 monitors the data read and written between the instruction processing circuit 10 and memory 12. The debug circuit 14 tests a value of this data against a condition that has been programmed into the debug circuit. If the data satisfies the condition the debug circuit 14 takes debug action.

Debug action may be the generation of an interrupt to the instruction execution circuit 10, for causing the instruction execution circuit 10 to stop normal processing of the program and to start executing a debug exception program. However, debug action as understood herein is not limited to the generation of interrupts: instead, for example, the debug circuit may capture additional data from the instruction processing circuit 10 and/or memory for later analysis (the additional data may include the program counter value, a timestamp, the content of registers etc.).

Alternatively, the debug action may be to preserve data and/or address values passed between the memory 12 and the instruction processing circuit 10 during a window of instruction cycles in a time interval relative to the cycle in which the condition was met (such information may stored for all cycles, only to be overwritten by data for other cycles unless the condition is met). Alternatively debug action may involve incrementing a count value, and taking other debug action once the count value reaches a specified value. It will be clear that many different debug actions are conceivable, undertaken by exception only when the condition is met.

A debug action is triggered as an exceptional result of instruction execution: triggering is not inherent to any instruction, but an exception generated when predefined circumstances occur during execution of an instruction. Thereupon the debug action facilitates inspection of the state of the data processor.

FIG. 1 shows the debug circuit 14 coupled to the connection between the instruction processing circuit 10 and the memory 12. This location is preferred because it provides a point where the most general access to processed data is available at the lowest cost. However, without deviating from the invention the debug circuit 14 may be located, elsewhere, for example between an ALU (Arithmetic Logic Unit, not shown) and a register file (not shown) in the processor or at an I/O port (not shown) etc.

In case of a RISC processor, memory load and store operations are performed only by load and store instructions. In that case, the circuit of FIG. 1 can take the debug action only in case of load and/or store instructions. However, the invention is not limited to RISC: the invention applies as well to processors that access memory as part of other instructions, such as arithmetic instructions.

Figure 2:
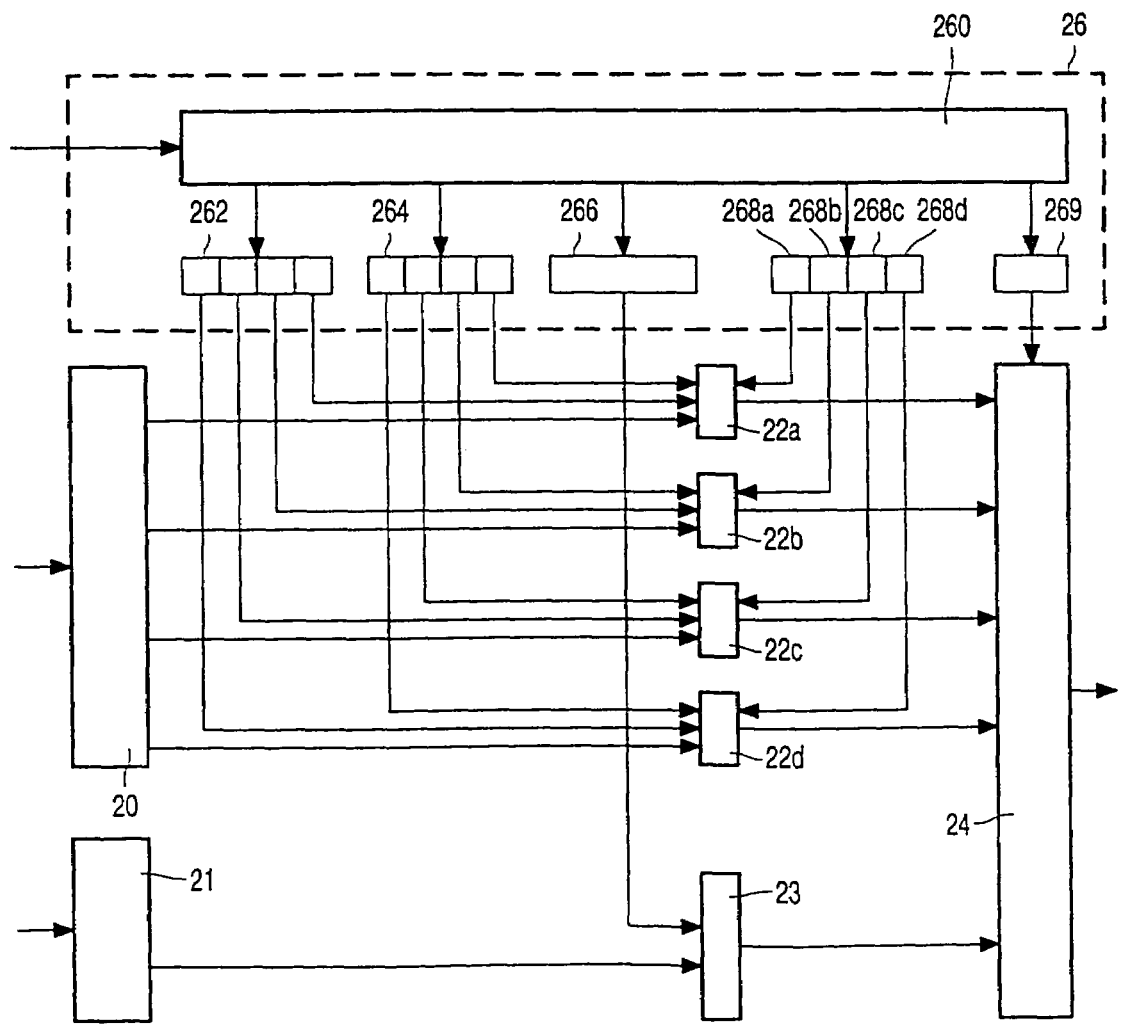
FIG. 2 shows part of a debug circuit.

FIG. 2 shows a part of the debug circuit 14 that is responsible for monitoring whether the condition is met. The part of the debug circuit contains a data input register 20, with outputs for respective fields of the data coupled to field condition testing circuits 22a-d respectively. The field condition testing circuits 22a-d have outputs to a logical combination circuit 24. In addition, the debug circuit has an address/control data register 21, coupled to an address/control data comparator 23. The address/control data comparator 23 also has an output connected to the logical combination circuit 24.

The debug circuit has a programming circuit 26 to control the condition tested by the debug circuit 14. The programming circuit 26 has a reference value register 262 with respective field outputs coupled to the field condition testing circuits 22a-d respectively. The programming circuit 26 has a mask register 264 with respective field outputs coupled to the field condition testing circuits 22a-d respectively. The programming circuit 26 has field condition programming registers 268a-d coupled to function control inputs of field condition testing circuits 22a-d respectively. The programming circuit 26 has a logical combination function programming register 269 coupled to the logic combination circuit 24.

The programming circuit 26 has a reference address/control data register 266 coupled to address/control data comparator 23.

A control circuit 260 is coupled to the reference value register 262, the mask register 264, the reference address/control data register, the field condition programming registers 22a-d, the combination function programming register 269.

One or more circuits like the one shown in FIG. 2 may be incorporated in the debug circuit 14 to test one or more conditions in parallel.

In operation data values passed between the instruction processing circuit 10 and the memory 12 is stored into data register 20. Similarly address and control data passed to the memory 12 is stored in address/control register 21.

The data register 20 divides the data values into different fields, for example four fields of 16 bits in case of 64 bit wide data. Of course this is an example: instead of four fields (as shown in FIG. 2) other numbers of fields may used. Similarly a different data size may be used.

Preferably, the fields correspond to the fields used in vector instructions processed by the instruction processing circuit 10. Such vector processing instructions specify one or more operands and treat these operands as a set of fields, each field containing an independent number. In response to a vector processing instruction like ADD the instruction processing circuit 10 adds numbers from corresponding fields of two operands for a number of fields in parallel. The results are written into different fields of a result operand. By using the vector field size in the debug circuit 14 as well, the debug circuit 14 performs tests on different vector components.

Preferably the fields have a predetermined size and positions in the operand, or a selectable one of a number of predetermined sizes and positions (in case of vector operations for different size fields, e.g. for 8 8-bit vector components are for 4 16-bit vector components).

Each condition testing circuit 22a-d tests the data from a different one of the fields. In the test, the data from the relevant field is compared with corresponding data from the reference data register 262. Optionally the condition testing circuit 22a-d masks out the comparison for a number of bits in the field according to a mask value in the mask register 264. Without deviating from the invention masking may be omitted.

The type of comparison for each particular field is controlled by the content of the field condition programming register 268a-d for that particular field. For example, the condition testing circuits 22a-d may provide for testing for any selectable condition from the following list: equality, not-equal, greater than, greater equal, less than, less equal. A smaller list of possible comparisons may also be used. Without deviating from the invention, a single field condition programming register may be used for all fields, or even a fixed type of comparison (e.g. test for equality) may be used.

Preferably, the address/control value comparator 23 compares the address used to load or store the data with a reference address from the reference address register and/or the address/control comparator 23 compares control signals used to transfer the data between the processor 10 and memory 12 with reference control signals (such signals may include read/write selection, access privileges, task ID etc.).

The logical combination circuit 24 logically combines the results of the comparisons in the different field condition testing circuits 22a-d. A result signal of the logical combination is output from the logical combination circuit 24 and used to trigger debug action. (By parts of the debug circuit not shown). Preferably, the type of logical combination is programmed with the combination function programming register 269. Thus, debug action may be triggered for example if a logical OR of condition signals that signal that a condition has been met for different ones of the fields of a data value. In this case any one of the fields may trigger debug action. However, other logical combinations may also be provided for, such as the logical OR of a selected subset of the fields, an exclusive OR of the condition signals (debug action if one and not more than one of the fields satisfies its condition), an exclusive or of the inverse of the condition signals (debug action if one and not more than one of the fields does not satisfy its condition) and so on.

Preferably, the logical combination circuit 24 also uses a result of the comparison performed by the address control/value comparator 23. Thus, debug action may be triggered only if a programmed address is involved and/or only incase of read from memory or in case of write to memory. Preferably, this condition on addressing is also programmable.

The programming information is loaded into the various registers 262, 264, 266, 268a-d, 269 by the control circuit. Preferably this is done under control of debug instructions executed by the instruction processing circuit. Debug instructions may be provided for enabling/disabling debug action, setting the reference data value, the mask value, condition control value and combination control value.

In summary: a data processor has a debug circuit arranged to monitor whether operand data used for execution of a program meets a debug exception condition. The debug exception condition tests a two or more of multi-bit subfields of a vector operand independently. Debug action is taken if one or more of the multi-bit subfields meet the corresponding conditions.

The invention claimed is:

1. A method of generating a debug signal in response to processor data read from or written to memory, comprising:
   for each of multiple distinct data fields of the processor data read from or written to memory:
   specifying a data field mask and a data field value, and further specifying a condition describing a relation between the specified data field value and an actual data field value present in the data field;

testing the actual data field value, taking into account said data field mask, and generating a preliminary debug signal if the condition is satisfied; and performing a logical combination of multiple preliminary debug signals to generate a final debug signal.

2. The method of claim 1, wherein the final debug signal is generated also in part in response to data storage signals pertaining to said processor data as a whole.

3. The method of claim 2, further comprising:

specifying one or more data storage signal test values, testing actual data storage signal values in relation to the one or more data storage signal test values and generating as a result a preliminary storage debug signal; and performing a logical combination of the preliminary storage debug signal with one or more other preliminary debug signals to generate the final debug signal.

4. A data processor having a debug circuit for generating a debug signal in response to processor data read from or written to memory, the debug circuit comprising:

means for, for each of multiple distinct data fields of the processor data read from or written to memory, specifying a data field mask and a data field value, and further specifying a condition describing a relation between the specified data field value and an actual data field value present in the data field;

means for, for each of multiple distinct data fields of the processor data read from or written to memory, testing the actual data field value, taking into account said data field mask, and generating a preliminary debug signal if the condition is satisfied; and means for performing a logical combination of multiple preliminary debug signals to generate a final debug signal.

5. The data processor of claim 4, wherein the final debug signal is generated also in part in response to data storage signals pertaining to said processor data as a whole.

6. The data processor of claim 5, further comprising:

means for specifying one or more data storage signal test values;

means for testing actual data storage signal values in relation to the one or more data storage signal test values and generating as a result a preliminary storage debug signal; and means for performing a logical combination of the preliminary storage debug signal with one or more other preliminary debug signals to generate the final debug signal.

* * * * *